US011732560B1

(12) United States Patent
Al-Humam et al.

(10) Patent No.: US 11,732,560 B1
(45) Date of Patent: Aug. 22, 2023

(54) NITRATE TREATMENT FOR INJECTIVITY IMPROVEMENT

(71) Applicant: SAUDI ARABIAN OIL COMPANY, Dhahran (SA)

(72) Inventors: Abdulmohsen A. Al-Humam, Dammam (SA); Ayman R. Al-Nakhli, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/654,646

(22) Filed: Mar. 14, 2022

(51) Int. Cl.
*E21B 43/20* (2006.01)
*C09K 8/60* (2006.01)

(52) U.S. Cl.
CPC .............. *E21B 43/20* (2013.01); *C09K 8/605* (2013.01)

(58) Field of Classification Search
CPC .......... E21B 43/20; C09K 8/605; C09K 8/582
See application file for complete search history.

(56) References Cited

U.S. PATENT DOCUMENTS

| | | | | |
|---|---|---|---|---|
| 2,807,507 A * | 9/1957 | Cook | ..................... | B60B 23/10 301/47 |
| 3,389,750 A * | 6/1968 | Bohor | ..................... | C09K 8/58 166/305.1 |
| 5,044,435 A * | 9/1991 | Sperl | ..................... | C09K 8/905 435/282 |
| 6,758,270 B1 * | 7/2004 | Sunde | ..................... | C09K 8/905 166/305.1 |
| 7,708,065 B2 * | 5/2010 | Hendrickson | ........... | C12P 39/00 507/201 |

(Continued)

FOREIGN PATENT DOCUMENTS

| | | | | |
|---|---|---|---|---|
| CA | 2695378 A1 | 3/2009 | | |
| RU | 2610051 C1 * | 2/2017 | ............. | E21B 43/16 |

OTHER PUBLICATIONS

Voordouw et al., "Sulfide Remediation by Pulsed Injection of Nitrate into a Low Temperature Canadian Heavy Oil Reservoir," Environ. Sci. Technol. 2009, 43, 9512-9518 (Year: 2009).*

(Continued)

*Primary Examiner* — Angela M DiTrani Leff
(74) *Attorney, Agent, or Firm* — Osha Bergman Watanabe & Burton LLP

(57) ABSTRACT

Methods of enhancing water injectivity into a subterranean wellbore may include injecting a first composition comprising nitrate anions having a nitrate concentration into a target zone of the subterranean wellbore; injecting a second composition comprising nitrate anions into the target zone of the subterranean wellbore, where the second composition has a nitrate concentration of from about 20% to about 70% the nitrate concentration of the first composition; optionally injecting a third composition comprising nitrate anions into the target zone of the subterranean wellbore, where the third composition has a nitrate concentration of from about 20% to about 70% the nitrate concentration of the second composition; and injecting water, where the water injection pressure is reduced by about 5% to 25% compared to the water injection pressure in an untreated subterranean wellbore, where the nitrate anions are reduced by bacteria present in the subterranean wellbore.

7 Claims, 3 Drawing Sheets

(56) References Cited

U.S. PATENT DOCUMENTS

| | | | |
|---|---|---|---|
| 7,740,063 B2* | 6/2010 | Fallon | C09K 8/582 |
| | | | 166/264 |
| 9,096,789 B2 | 8/2015 | Durham et al. | |
| 11,441,063 B1* | 9/2022 | Al-Nakhli | E21B 49/008 |
| 2010/0212888 A1 | 8/2010 | Hendrickson et al. | |
| 2010/0216217 A1* | 8/2010 | Hendrickson | C12N 1/205 |
| | | | 435/252.4 |
| 2013/0056203 A1 | 3/2013 | Alsop et al. | |
| 2013/0056214 A1 | 3/2013 | Alsop et al. | |
| 2014/0000874 A1* | 1/2014 | Alsop | C09K 8/532 |
| | | | 166/268 |
| 2016/0017208 A1* | 1/2016 | Coates | C09K 8/58 |
| | | | 507/274 |
| 2018/0135393 A1* | 5/2018 | Voordouw | C09K 8/582 |

OTHER PUBLICATIONS

Lyu et al., An approach for determining water injection pressure of low-permeability reservoirs, Energy, Exploration, Exploitation, 2018, vol. 36(5) 1210-1228 (Year: 2018).*

Translation of RU-2610051-C1 (Year: 2017).*

Alklih, Mohamad Yousef, et al., "A Novel Method for Improving Water Injectivity in Tight Sandstone Reservoirs", Journal of Petroleum Engineering, Hindawi Publishing Company, vol. 2014, Article ID 864624, Sep. 2014, pp. 1-7 (7 pages).

Da Silva, Marcio Luis Busi, et al., "Effects of Nitrate Injection on Microbial Enhanced Oil Recovery and Oilfield Reservoir Souring", Appl Biochem Biotechno, Springer Science+Business Media, Aug. 2014, pp. (12 pages).

Grigoryan, A., et al., "Souring Remediation by Field-wide Nitrate Injection in an Alberta Oil Field", Journal of Canadian Petroleum Technology, vol. 48, No. 5, May 2009, pp. 58-61 (4 pages).

Hassan, Amjed M. and Hasan S. Al-Hashim, "A Novel Technique for Continuous Improvement of Injectivity and Improving Oil Recovery for Carbonate Reservoirs", SPE-187617-MS, Society of Petroleum Engineers, Oct. 2017, pp. 1-16 (16 pages).

Suri, Navreet, et al., "The Effectiveness of Nitrate-Mediated Control of the Oil Field Sulfur Cycle Depends on the Toluene Content of the Oil", Frontiers in Microbiology, vol. 8, Article 956, May 2017, pp. 1-13 (13 pages).

* cited by examiner

NITRATE TREATMENT FOR INJECTIVITY IMPROVEMENT

BACKGROUND

In order to increase the productivity of a reservoir, to maintain reservoir pressure, or improve oil recovery, several recovery processes may be used. These processes may include the injection of fluids, such as water, into the reservoir to maintain reservoir pressure and drive the reservoir remaining hydrocarbons to production wells. In particular, waterflooding, which is also referred to as an improved oil recovery (IOR) process may be used to recover hydrocarbons from both sandstone and carbonate reservoirs. The use of waterflooding involves the injection of water, either pure seawater, produced water, or diluted water, into the reservoir to displace or physically sweep residual oil. Waterflooding may result in unproductive oil recovery when the injectant is diverted in permeable zones or fractures of the reservoir. In addition, injecting water into underground formations for reservoir pressure maintenance, improving oil recovery and as a disposing produced water, may result in incompatibility between the reservoir fluids and the injected water. This may cause severe precipitation and reduce the well injectivity due to formation damage, resulting in the need for treatments to remove the damage and recover the well injectivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, methods of enhancing water injectivity into a subterranean wellbore are provided. The methods may include injecting a first composition comprising nitrate anions having a nitrate concentration into a target zone of the subterranean wellbore. The methods may also include injecting a second composition comprising nitrate anions into the target zone of the subterranean wellbore, where the second composition has a nitrate concentration of from about 20% to about 70% the nitrate concentration of the first composition. In addition, the methods may optionally include injecting a third composition comprising nitrate anions into the target zone of the subterranean wellbore, where the third composition has a nitrate concentration of from about 20% to about 70% the nitrate concentration of the second composition. The methods may further include injecting water, where the water injection pressure is reduced by about 5% to 25% compared to the water injection pressure in an untreated subterranean wellbore. In the methods of enhancing water injectivity into a subterranean wellbore, the nitrate anions are reduced by bacteria present in the subterranean wellbore.

Other aspects and advantages of the claimed subject matter will be apparent from the following description and the appended claims.

DETAILED DESCRIPTION

Figure 1:
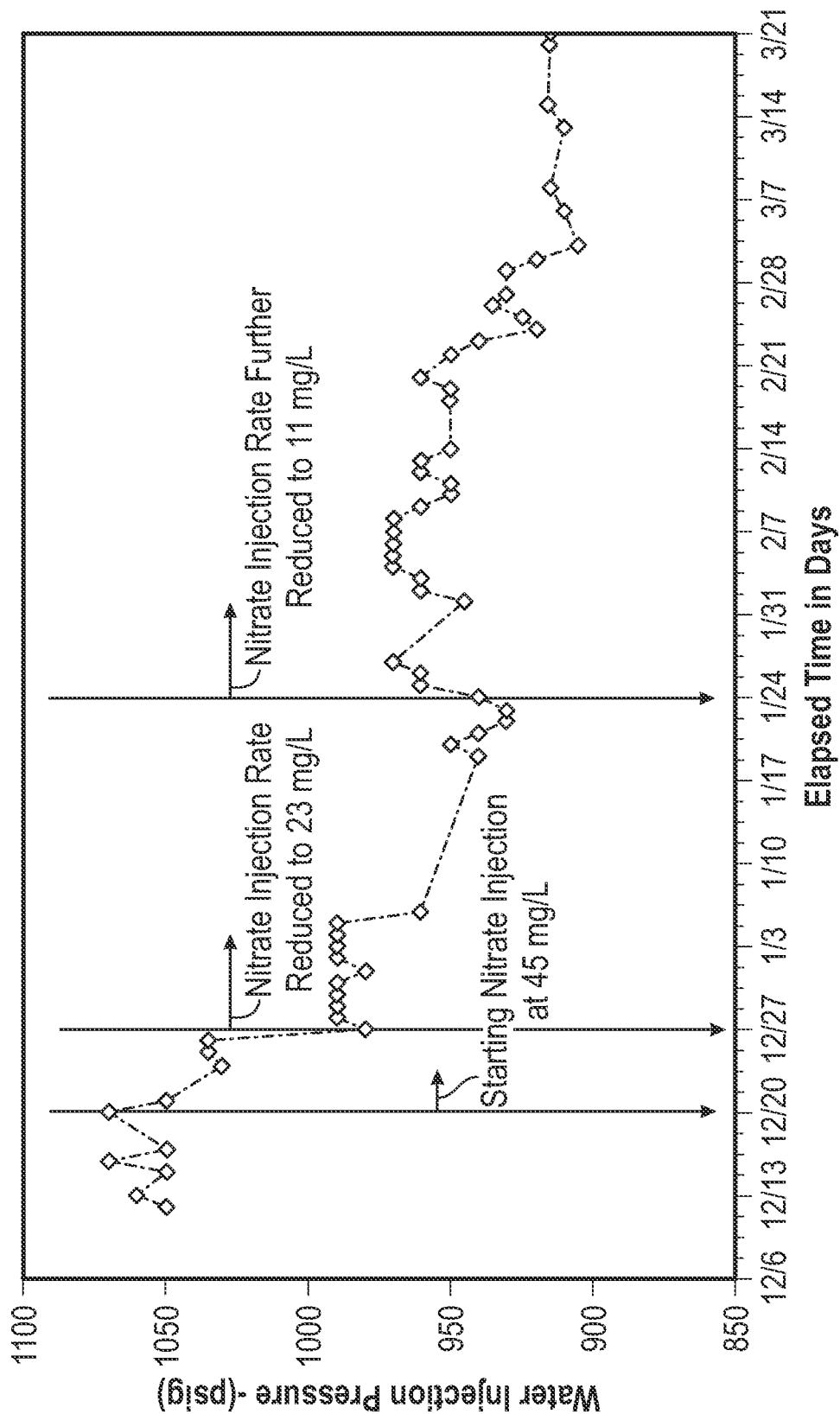
FIG. 1 is a graph illustrating the water injection pressure (psig) in function of time before and during the nitrate treatment of Example 1.

Injecting water into underground formation may be used in petroleum production operations for several purposes such as, reservoir pressure maintenance, improving oil recovery and as disposing produced water. In reservoirs management practices, water (either pure seawater, produced water, or diluted water) is used for pressure maintenance proposed or for improving the recovery of hydrocarbon through water flooding operation. In all of these applications, the key performance indicator is how long the injectivity index of each individual injection wells can be maintained over the injection periods. At a wellbore area, assessing the daily injected volume of water as a result of differential pressure between the mean bottom hole injection pressure and formation pressure may provide insights about the wellbore condition. A decline in the injectivity index is a common problem in all types of water injection wells, which is caused by formation damage introduced near the wellbore area. In some cases, continuous stimulation is always needed to retrieve the injectivity, but due to severe injectivity loss in some areas, entire operations may be stopped due to technical difficulties or as result of the high cost of keeping the wells injecting. As such, there is a need for improved methods.

According to one embodiment, a nitrate treatment method is used to improve the water injectivity in tight reservoirs. The nitrate treatment method according to some embodiments includes nitrate reduction to nitrogen gas by nitrate utilizing bacteria (NUB) or nitrate reducing bacteria (NRB). In addition, the method may control the corrosion generated by the sulfate reducing bacteria (SRB). A nitrate treatment is provided as a method to improve tight hydrocarbon production by using microbial flora present in the formation and capable of utilizing nitrate and reducing it to nitrogen gas ($N_2$). This $N_2$ gas will increase the pressure in the reservoir and create more favorable flowing conditions, improving the injection permeability.

The nitrate treatment includes the following steps. The reduction of nitrate by NRB is an example of respiratory metabolism under anaerobic conditions, using nitrate as a terminal electron acceptor. Reaction (1) is catalyzed by nitrate reductase enzymes:

$$NO_3^- + 2e + 2H^+ \longrightarrow NO_2^- + H_2O \quad (1)$$

Some specialized strains of bacteria, such as Pseudomonas and Paracoccus species, may reduce nitrate beyond the level of nitrite, converting nitrate through nitrite to nitric oxide (NO) and nitrous oxide ($N_2O$) to molecular nitrogen ($N_2$) according to Reaction (2):

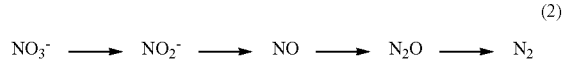

$$NO_3^- \longrightarrow NO_2^- \longrightarrow NO \longrightarrow N_2O \longrightarrow N_2 \quad (2)$$

The ability to form $N_2$ from nitrate is termed denitrification and the overall reduction reaction (3) is as follows:

$$2NO_3^- + 10e + 12H^+ \longrightarrow N_2 + 6H_2O \quad (3)$$

The advantages of using nitrate treatment for the stimulation of hydrocarbon reservoirs include the increase in the pressure of the reservoir by producing nitrogen gas and the creation of more favorable flowing conditions. Additionally, the water injectivity is improved and the reservoir microbial souring and corrosion due to sulfate reducing bacteria (SRB) are decreased. Such a treatment provides an environmentally-friendly, reversible, cost effective solution applicable at high temperatures.

According to one embodiment, a nitrate treatment method may enhance water injectivity into a subterranean wellbore. The method may include the injection of a first composition comprising nitrate anions having a nitrate concentration into a target zone of the subterranean wellbore. The nitrate treatment method may further include the injection of a second composition comprising nitrate anions into the target zone of the subterranean wellbore, where the second composition may have a nitrate concentration of from about 20% to about 70% the nitrate concentration of the first composition. The second composition may have a nitrate concentration of from about 40% to about 60% the nitrate concentration of the first composition. The second composition may have a nitrate concentration of from about 45% to about 50% the nitrate concentration of the first composition.

The nitrate treatment method may also optionally include the injection of a third composition comprising nitrate anions into the target zone of the subterranean wellbore, where the third composition may have a nitrate concentration of from about 20% to about 70% the nitrate concentration of the second composition. The third composition may have a nitrate concentration of from about 40% to about 60% the nitrate concentration of the second composition. The third composition may have a nitrate concentration of from about 45% to about 55% the nitrate concentration of the second composition.

The method may then include the injection of water, where the water injection pressure is reduced by about 5% to 25% compared to the water injection pressure in an untreated subterranean wellbore. The method may then include the injection of water, where the water injection pressure is reduced by about 7% to 20% compared to the water injection pressure in an untreated subterranean wellbore. The method may then include the injection of water, where the water injection pressure is reduced by about 9% to 15% compared to the water injection pressure in an untreated subterranean wellbore. The method may then include the injection of water, where the water injection pressure is reduced by about 10% to 15% compared to the water injection pressure in an untreated subterranean wellbore.

In the nitrate treatment method according to one or more embodiments, the nitrate anions are reduced by bacteria present in the subterranean wellbore. Nitrate anions or nitrates may serve to stimulate the growth of the NRB present in the subterranean formation or the water that serves as a basis for the fracturing fluid, thus outcompeting SRB present in the formation. Nitrate anions may be used as part of the fracturing fluid injected into the subterranean formation. Nitrate anions may be anions from salts including potassium nitrate, sodium nitrate, ammonium nitrate, and mixtures thereof.

The amount of nitrate anions included as part of the fracturing fluid is dependent upon a number of factors, including the amount of sulfate in the hydrocarbon, the amount of sulfate in the fracturing fluid itself, the permeability of the formation, and the expected amount of NRB needed to counteract the SRB. Typical concentration of inorganic nitrate in the fracturing fluid is less than 2000 ppm by weight of the solution. More often, the concentration of inorganic nitrate is between 500 to 1000 ppm by weight, most often between about 700 and 800 ppm by weight.

NRB are often indigenous in the subterranean formation or already present in the fracturing fluid and simple addition of the inorganic nitrate may be adequate to stimulate the NRB to outcompete SRB for the non-polymer carbon source. However, in certain circumstances, such as when the indigenous amount of NRB is inadequate or wholly absent, it may be necessary to supplement the indigenous NRB with suitable additional NRB in the fracturing fluid. Thus, in certain embodiments of the present invention, NRB are added to the fracturing fluid.

Those of ordinary skill in the art with the benefit of this disclosure will recognize acceptable examples of NRB appropriate for use in this invention. NRB include any type of microorganism capable of performing anaerobic nitrate reduction, such as heterotrophic nitrate-reducing bacteria, and nitrate-reducing sulfide-oxidizing bacteria. This may include, but is not limited to, *Campylobacter* sp., *Nitrobacter* sp., *Thiobacillus* sp., *Nitrosomonas* sp., *Thiomicrospira* sp., *Sulfurospirillum* sp., *Thauera* sp., *Paracoccus* sp., *Pseudomonas* sp., *Rhodobact er* sp., or Specific examples include, but are not limited to, *Nitrobacter vulgaris*, *Nitrosomonas europea*, *Pseudomonas stutzeri*, *Pseudomonas aeruginosa*, *Paracoccus denitrificans*, *Sulfurospirillum deleyianum*, and *Rhodobacter sphaeroides*.

The amount of NRB included in the fracturing fluid will depend upon a number of factors including the amount of SRB expected, as well as the permeability and porosity of the subterranean formation. In certain embodiments of the present invention, the amount of NRB in the fracturing fluid is between 1 and $10^8$ bacteria count/ml of the fracturing fluid, preferably between $10^1$ and $10^4$ bacteria count/ml of the fracturing fluid.

NRB of the present disclosure may convert nitrate anions to nitrites. In addition, in certain embodiments of the present invention, the NRB of the present disclosure also may convert nitrites to ammonia. In certain other embodiments of the present invention, the NRB of the present disclosure may convert ammonia to nitrogen gas. Thus, in addition to adding nitrates to the fracturing fluid, in certain embodiments of the present invention, inorganic nitrites may also be added to the fracturing fluid. It has further been found that nitrites may scavenge hydrogen sulfide, further reducing the souring of the hydrocarbon produced. Inorganic nitrites include, for instance sodium nitrite and potassium nitrite and are typically added in the range of between about 5 and 100 ppm by weight of the fracturing fluid.

In addition to stimulating the NRB to out compete the SRB, it may be desirable to introduce additional SRB inhibitors in certain embodiments of the present invention together with the inorganic nitrates. Examples of SRB inhibitors suitable for the present invention are 9,10-anthraquinone, molybdates and molybdate salts, such as sodium molybdate and lithium molybdate, although any SRB inhibitor may be used in concentrations where the molybdates do not unduly affect the ability of the NRB to otherwise out compete the SRB. In certain embodiments of the present invention, molybdate is added to the fracturing fluid in the range of 5 to about 100 ppm by weight of fluid.

EXAMPLES

Example 1-Sulfide Data Before and During the Nitrate Treatment at the FCC

A field experiment was conducted in an oil field water injection system to determine the effect of nitrate ($NO_3^-$) for controlling sulfate reducing bacteria (SRB) in oilfield operations, and microbial influence corrosion (MIC) for surface pipelines. Differences in SRB control effectiveness between nitrate and current biocide treatment were identified. The optimum dosing and environmental conditions for the nitrate treatment were also determined.

Data collected showing that Nitrate Utilizing Bacterial (NUB) and Nitrate

Reducing Bacteria (NRB) were present in sufficient amount throughout the oilfield to make use of a nitrate treatment. The injection of nitrate anions increased the activity of NUB and NRB to control the SRB activity and scavenge the $H_2S$ produced by SRB. Water injection pressure data before and during the nitrate treatment results are shown in FIG. 1. The result shows that during the biocide treatment, the water injectivity pressure was between 1050 and 1070 psig. With the nitrate treatment of 45 mg/L a massive improvement in the injectivity was reduced with injectivity pressure to 960 psig. This significant change in the injectivity was continued when the nitrate was reduced to 23 mg/L injectivity pressure 930 psig. The second optimization of the nitrate treatment to 11 mg/L did not significantly change the water injection pressure and remained between 950 and 930 psig until the end of the nitrate field trial. The results show a major improvement in the injectivity occurred by the nitrate treatment in the field (well head pressure was reduced from 1050 to 930 during the treatment period). This shows the beneficial side effect of nitrate treatment in the water injection system. The injectivity improvement that occurred in field was consistent with increase in microbial population of NUB, and NRB. In all monitored locations, injectivity also improved, but the rate of this was different from 10% to 15% improvement and from location to other location.

Example 2-Sulfide Data Before and During Nitrate Treatment

Figure 2:
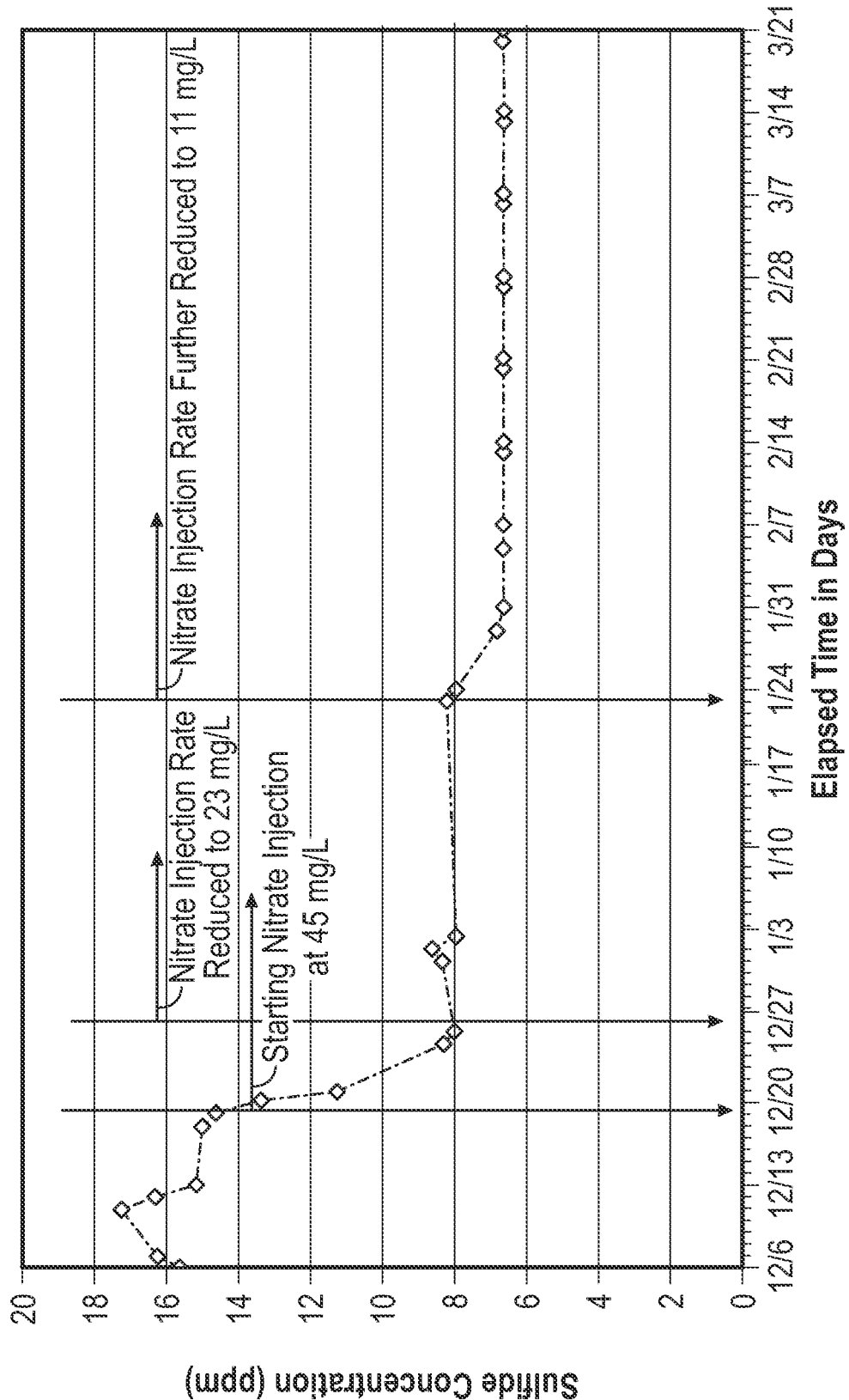
FIG. 2 is a graph illustrating the sulfide concentration (ppm) before and during the nitrate treatment of Example 1.

FIG. 2 shows the sulfide concentration detected between 15.8 and 17.3 ppm during the nitrate treatment described in Example 1. As shown in FIG. 2, after the nitrate addition the sulfide concentration significantly decreased during the nitrate treatment, at 45 mg/L (nitrate ion) the sulfide concentration decreased to 8.3 ppm. Moreover, when nitrate concentration reduced to 23 mg/l, the sulfide level did not significantly change and remained at 8 mg/L. In addition, the sulfide concentration reduced with the reduction in the nitrate dose to 11 mg/L. The sulfide level dropped to 6.7 mg/L. The sulfide production showed sulfide inhibition at 45 and 11 mg/L of nitrate added.

Example 3-Microbiological Monitoring

Prior to the nitrate treatment of Example 1, the SRB numbers did not significantly change (FIG. 3), remaining at $10^2$ SRB/ml level before the injection of nitrate. These activities were dropped to by 50% when nitrate was injected at a concentration of 45 mg/l. Such a nitrate treatment showed promise effectiveness in controlling the SRB activities. A second injection of nitrate was followed at a concentration 50% less than the first nitrate injection. The second injection rate, 23 mg/l, was maintained for three weeks. At the end of the three weeks, the SRB activities were dropped to below the detection limits. An increase in the SRB activities was observed later in the system and maintained at 101 SRB/ml. The nitrate treatment was continued with an injection rate was maintained at 11 mg/l. During the course of the nitrate treatment at 11 mg/l, the minimum SRB achieved by nitrate treatment was $10^1$ bacteria/ml.

Figure 3:
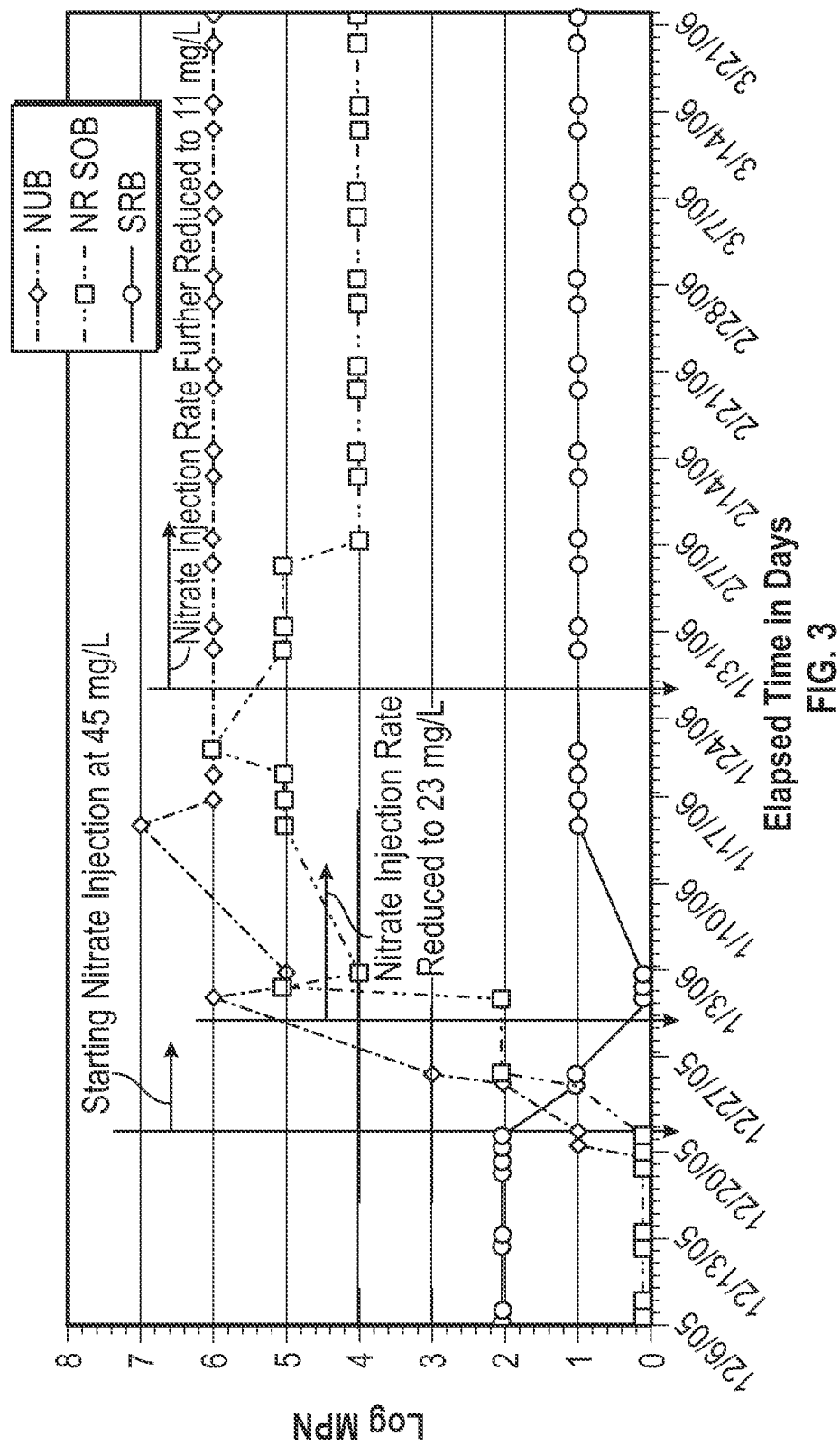
FIG. 3 is a graph illustrating the planktonic microbial concentration before and during the nitrate treatment of Example 1.

As illustrated in FIG. 3, SRB activity was suppressed with the nitrate between 45 and 23 mg/L. This inhibition of SRB has been reported in studies involving oil-field production water receiving additions of nitrate. A possible explanation for the SRB inhibition may be attributed to the presence of NUB population out-competing the SRB population for electron donors or a toxic compound being present like $NO_2$, and/or redox changes in the system. Although, SRB numbers were increased at nitrate concentration between 23 and 11 mg/l nitrate, a likely reason for this observation could be the reduction in the nitrate concentration or due to some SRB were able to use nitrate as an electron acceptor during the treatment and, therefore, were not inhibited when nitrate treatment was switched to 11 mg/L.

As illustrated in FIG. 3, NUB population was undetected before the nitrate treatment, during the period of biocide treatment program. However, a moderately high NUB population was detected; initially, with 104 NUB/ml. This increased over the nitrate treatment with 45 mg/L nitrate to some $10^6$ NUB/ml. The planktonic NUB population does not appear to change when the nitrate treatment was reduced below 23 mg/L and 11 mg/L—it remained at 106/ml over 7 days and then after 56 days period when nitrate concentration was steadily reduced. It is clear that a highly active NUB population present in the field system were responsible for the observed reductions in sulfide generation rate during the nitrate treatment period and the correlation between sulfide generation before the nitrate treatment and the apparent slowing of NUB growth indicates that it is the activity (not just the numbers) of NUB that suppresses the sulfide generation.

As shown in FIG. 3, the NRSOB population follows the same trends as discussed above with NUB. NRSOB numbers increased (from $10^3$ to $10^6$ /ml) over the treatment with nitrate at 45 mg/L. When the nitrate dose was reduced, NRSOB numbers decrease from $10^6$ per ml to $10^4$ per ml. There is thus a direct correlation between NRSOB growth and the nitrate concentration. The increase in NRSOB numbers also correlates with the inhibition in the sulfide production over the nitrate treatment period with 45 mg/l nitrate, and with the failure of control when the nitrate ion concentration fell below 23 mg/L. The conclusion is clear—NRSOB (like NUB) are effectively inhibiting sulfide production when using sufficient amount of the nitrate treatment.

In view of the above, injectivity results illustrated in FIG. 1 show that during the biocide treatment before nitrate treatment, the water injectivity pressure was between 1050 and 1070 psi. During the nitrate treatment of 45 mg/L, the injectivity was reduce to 960 psi. This significant change in the injectivity was continued when the nitrate was reduced to 23 mg/l with a reduction in injectivity pressure to 930 psi. With the further reduction in the concentration of nitrate treatment to 11 mg/l, the water injection pressure did not significantly change and remained between 950 and 930 psi until the end of the nitrate field trial.

The results indicate that substantial reduction in the injectivity over the nitrate treatment period in the field (injectivity was reduced from 1050 to 930 psi during the three months period). The injectivity improvement was consistent with this active microbial population of NUB, and NRSOB. Monitoring over various locations showed that injectivity also fell, with different rates of from 10% to 15% improvement. Without being bound by theory, a reason for these differences may be that nitrate compounds may act as surfactants in the reservoir and effect the water injection pressure that was observed during the nitrate treatment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of enhancing water injectivity into a subterranean wellbore, the method comprising:
    prior to a nitrate treatment, obtaining water injection pressure data for a subterranean wellbore;
    performing the nitrate treatment, wherein the nitrate treatment comprises:
        injecting a first composition comprising nitrate anions having a nitrate concentration into a target zone of the subterranean wellbore;
        injecting a second composition comprising nitrate anions into the target zone of the subterranean wellbore, where the second composition has a nitrate concentration of from about 20% to about 70% the nitrate concentration of the first composition; and
        injecting water,
    following the nitrate treatment, obtaining water injection pressure data for the subterranean wellbore,
    where the water injection pressure in the subterranean wellbore following the nitrate treatment is reduced by about 5% to 25% compared to the water injection pressure in the subterranean wellbore prior to the nitrate treatment, and
    where the nitrate anions are reduced by bacteria present in the subterranean wellbore.

2. The method of claim 1, where the nitrate anions comprise potassium nitrate, sodium nitrate, ammonium nitrate, and mixtures thereof.

3. The method of claim 1, where the bacteria comprises *Campylobacter* sp., *Nitrobacter* sp., *Nitrosomonas* sp., *Thiomicrospira* sp., *Sulfurospirillum* sp., *Thauera* sp., *Paracoccus* sp., *Pseudomonas* sp., *Rhodobacter* sp., *Desulfovibrio* sp., or mixtures thereof.

4. The method of claim 1, where the water injection pressure is reduced by about 10% to 15% compared to the water injection pressure in the untreated subterranean wellbore prior to the nitrate treatment.

5. The method of claim 1, where the second composition has a nitrate concentration of from about 45% to about 70% the nitrate concentration of the first composition.

6. The method of claim 1, wherein the nitrate treatment further comprises injecting a third composition comprising nitrate anions into the target zone of the subterranean wellbore, where the third composition has a nitrate concentration of from about 20% to about 70% the nitrate concentration of the second composition.

7. The method of claim 6, where the third composition has a nitrate concentration of from about 40% to about 60% the nitrate concentration of the second composition.

* * * * *